United States Patent [19]

Ando et al.

[11] Patent Number: 5,019,960

[45] Date of Patent: May 28, 1991

[54] MASTER-SLAVE SIGNAL TRANSFER SYSTEM FOR ELEVATOR

[75] Inventors: Hiroshi Ando; Junichi Tanino, both of Inazawa, Japan

[73] Assignee: Mitsubishi Denki Kabushiki Kaisha, Japan

[21] Appl. No.: 350,169

[22] Filed: May 11, 1989

[30] Foreign Application Priority Data

May 13, 1988 [JP] Japan ............................... 63-116382

[51] Int. Cl.[5] ........................... G06F 15/46; B66B 1/14

[52] U.S. Cl. ..................................... 364/132; 187/101; 187/121; 364/184

[58] Field of Search ........ 187/118, 101, 133, 121-129, 187/102, 105, 130, 132, 139, 140; 340/825.05, 825.08, 825.5; 364/580, 132, 131-136, 138, 139, 184

[56] References Cited

U.S. PATENT DOCUMENTS

| | | | |
|---|---|---|---|
| 4,162,719 | 7/1979 | Husson et al. | 187/124 |
| 4,567,560 | 1/1986 | Polis et al. | 364/184 |
| 4,622,538 | 11/1986 | Whynacht et al. | 364/551.01 X |
| 4,639,912 | 1/1987 | Tanino | 370/86 |
| 4,709,788 | 12/1987 | Harada | 187/124 |
| 4,762,204 | 8/1988 | Blain et al. | 187/124 X |
| 4,846,310 | 7/1989 | Tanino | 187/121 |
| 4,858,727 | 8/1989 | Tanino | 187/121 |
| 4,872,532 | 10/1989 | Tobita et al. | 187/121 |

FOREIGN PATENT DOCUMENTS

| | | |
|---|---|---|
| 58-69685 | 4/1983 | Japan . |
| 60-197573 | 10/1985 | Japan . |
| 62-74892 | 4/1987 | Japan . |
| 62-74893 | 4/1987 | Japan . |

*Primary Examiner*—Joseph Ruggiero

*Attorney, Agent, or Firm*—Leydig, Voit & Mayer

[57] ABSTRACT

A signal transfer system for an elevator including a master station and a plurality of slave stations, each slave station having provision for generating call signals and illuminating a call registratioin lamp. The master station generates a call registration signal in response to cage call and hall call signals. Each slave station also includes a timer which measures the time interval between transmission of a hall or cage call signal and a call registration signal. When the call registration signal is not received within a predetermined period of time, the respective slave station retransmits the hall or cage call signal. The call registration lamp is extinguished if the slave station has not received the call registration signal after a predetermined number of signal retransmissions.

4 Claims, 6 Drawing Sheets

MASTER-SLAVE SIGNAL TRANSFER SYSTEM FOR ELEVATOR

BACKGROUND OF THE INVENTION

This invention relates to a system in which the signals of an elevator, especially the call signals thereof are transferred by the use of microcomputers.

The hall of an elevator is equipped with hall buttons for registering hall calls, hall call registration lamps for indicating that the hall calls have been registered, a position indicator for indicating the position of a cage, etc., while the cage is interiorly equipped with destination buttons for registering the cage calls of destination floors, cage call registration lamps for indicating that the cage calls have been registered, a position indicator, door opening and closing buttons, etc. Consequently, the number of signal lines for transferring such signals increases with the number of floors, and it becomes very large in a multistoried building.

A system which improves the defect is, for example, one disclosed in the official gazette of Japanese Patent Application Laid-open No. 58-69685. As one-chip microcomputers have come into wide use and become less expensive in recent years, it has become possible to substitute the microcomputer for a memory device mentioned in the literature and to further reduce the number of signal lines. This measure will be explained with reference to FIGS. 6–8. FIG. 6 is a block circuit diagram of the general construction, FIG. 7 is a detailed diagram of a portion VII in FIG. 6, and FIG. 8 is a waveform diagram of a transfer signal.

Referring to FIG. 6, numeral 1 designates a master station which is disposed in the control panel of a machinery room and which is constructed of a microcomputer including therein a signal serial-transfer interface (hereinbelow, called "UART") 2, several tens ports, etc. The UART 2 transmits and receives signals to and from a slave station 53 which is constructed of a microcomputer installed in a cage 51 as will be stated later. Numerals 11–19 indicate slave stations which are disposed in the hallmanipulation panels of respective floors, and each of which is constructed of a microcomputer similar to that of the master station 1. Position indicators 21–29 are respectively connected to the slave stations 11–19. Likewise, hall buttons (as to which up buttons and down buttons are not distinguished) 31–39 are connected, and hall call registration lamps (as to which up calls and down calls are not distinguished) 41–49 for displaying the registrations of hall calls are connected. Numeral 52 denotes a cage manipulation panel which is disposed in the cage 51, and on which destination buttons, cage call registration lamps, door opening and closing buttons, etc. (with no numerals assigned thereto) are arranged. The slave station 53 is disposed in the cage control panel 52 and is similar to each of the slave stations 11–19, and a position indicator 54 is connected to the slave station 53. A signal bus 55 connects the master station 1 and the slave stations 11–19, and a ground line 56 corresponds to the signal bus 55. A signal line 57 connects the UART 2 of the master station 1 and the slave station 53, and a ground line 58 corresponds to the signal line 57. Numerals 61–69 denote signal branch lines which are connected to the signal bus 55 by the use of connectors (not shown) or the like, and which are connected to the slave stations 11–19 of the respective floors. Incidentally, although various power source lines are laid from the control panel to the cage manipulation panels 52, only the lines concerning the signal transfers are depicted here.

Referring to FIG. 7, symbol RxD denotes the reception terminal of the slave station 13, and symbol TxD the transmission terminal thereof. A transmission terminal line 70 is connected to the transmission terminal TxD. Shown at numerals 71 and 72 are transistors for transmission. The transmitting/receiving portion of each of the other slave stations 11, 12, 14–19, and 53 is constructed similarly to the above.

Referring to FIG. 8, numerals 81–90 designate serial data items which are transmitted and received by asynchronous transfer. The data item 81 is a start bit, the data items 82–89 are data of 8 bits, and the data item 90 is a stop bit.

The prior-art signal transfer system for an elevator is constructed as stated above. First, there will be explained a case where the master station 1 transmits a signal and where the slave station 13 receives the signal.

Addresses for the master station 1 and the slave stations 11–19 are respectively set in, for example, a memory. The master station 1 to transmit a signal, initially sends the address of any of the slave stations 11–19 to receive the signal. Now, in a case where the address of the slave station 13 is "13" in the hexadecimal notation and where the master station 1 sends data of "01" to the slave station 13, the master station delivers the address "13" (with the bits 82–84 at an "L" (low) level and the bits 85–87 at an "H" (high) level) to the signal bus 55 in the format as shown in FIG. 8, and it thereafter delivers the data "01" (with the bits 82–88 at the "L" level and the bit 89 at the "H" level). In response to the operation of the master station 1, all the slave stations 11–19 receive the address signal of "13". However, each of the slave stations 11–19 is programmed so as to start the reception of the data only when the received address agrees with its own address. Therefore, only the slave station 13 starts the reception of the data and accepts the data "01" from the signal branch line 63 and through the reception terminal RxD.

Next, there will be explained a case where the slave station 13 transmits a signal and where the master station 1 receives the signal.

In a case where the address of the master station 1 is "01" and where the slave station 13 transmits data of "11", the slave station 13 operates similarly to the above, to deliver the address "01" from the transmission terminal line 70 to the signal branch line 63 and the signal bus 55 and to thereafter deliver the data "11". More specifically, when the transmission terminal line 70 is at the "L" level, the transistor 71 is nonconductive, and hence, the transistor 72 becomes conductive, so that the signal branch line 63 becomes the "L" level. On the other hand, when the transmission terminal line 70 is at the "H" level, the transistor 71 becomes conductive, and hence, the transistor becomes nonconductive, so that the signal branch line 63 achieves the "H" level. In this way, the data is delivered.

The same applies to cases where the master station 1 transmits or receives signals to or from the other slave stations 11, 12, and 14–19. In addition, the transmission/reception of a signal between the master station 1 and the slave station 53 of the cage 51 is effected through the UART 2 as well as the signal line 57.

Subsequently, processing will be explained in the case where a call has occurred in the hall of any floor.

It is now assumed that the hall button 39 connected to the slave station 19 has been depressed for a hall call. The master station 1 is polling the slave stations 11–19 at a fixed cycle, and each of the slave stations 11–19 is so programmed that it can send the hall call signal of its own to the master station 1 only when it is designated. After the slave station 19 has transmitted the hall call signal of its own to the master station 1 in this way, a hall call registration signal indicating that the hall call signal of the slave station 19 has been accepted is transmitted from the master station 1, and the slave station 19 receives the hall call registration signal. In such a manner, the transfers of the hall call signals of the respective floors are completed. In order to avoid a lighting delay ascribable to the polling cycle, the hall call registration lamp 49 is illuminated by the slave station 19 at the point of time of the occurrence of the hall call without awaiting the reception of the hall call registration signal from the master station 1.

The same applies to a cage call which is generated by the cage manipulation panel 52, and the cage call registration lamp is illuminated by the slave station 53 at the point of time of the generation of the cage call.

With the prior-art signal transfer system for the elevator as described above, when the hall call has occurred by way of example, the corresponding one of the hall call registration lamps 41–49 is illuminated at the time of the occurrence of the hall call without awaiting the transmission of the hall call registration signal from the master station 1. Therefore, if the hall call signal transmitted from the corresponding one of the slave stations 11–19 is not transferred to the master station 1 due to a transfer fault or the like, there arises the problem that merely the corresponding one of the hall call registration lamps 41–49 is lit up and that the cage 51 does not arrive in spite of a long wait. Meanwhile, with a measure wherein the corresponding one of the hall call registration lamps 41–49 is illuminated after the transmission of the hall call registration signal from the master station 1, the delay of the lighting attributed to the polling cycle or a program cycle is sometimes involved, and this causes users to feel anxiety.

SUMMARY OF THE INVENTION

This invention has been made in order to solve the problems mentioned above, and has for its object to provide a signal transfer system for an elevator in which, even when a call having occurred in a slave station is not transmitted to a master station, a cage can be allocated subject to a temporary fault, and in which, when a call registration signal is not received from the master station, an abnormality can be displayed for a user.

A signal transfer system for an elevator according to this invention furnishes each of slave stations with a timer which starts a timekeeping operation when the slave station transmits a call signal to a master station, reply detection means adapted to operate when a call registration signal from the master station is not sent as a reply within a predetermined time since the transmission of the call signal from the slave station, and abnormality detection means for retransmitting the call signal to the master station when the reply detection means operates, and for flickering or putting out a call registration lamp already lit up when the call registration signal is not received in spite of retransmitting the call signal a predetermined number of times.

In this invention, when a call has occurred, the slave station lights up the call registration lamp and transmits the call signal to the master station, and when the call registration signal from the master station is not thereafter sent as the reply within the predetermined time, the slane station retransmits the call signal. Therefore, subject to a temporary fault, the call signal transferred to the master station is retransmitted the predetermined number of times. In addition, when the call registration signal is not sent as the reply in spite of retransmitting the call signal the predetermined number of times, the call registration lamp is flickered or put out, whereby the occurrence of a serious fault which is not temporary is displayed for a user.

BRIEF DESCRIPTION OF THE DRAWINGS

FIGS. 3–5 are flow charts showing the programs of operations, in which FIG. 3 illustrates the program of a master station, FIG. 4 illustrates the program of a slave station, and FIG. 5 illustrates the subprogram of the slave station; and FIGS. 6–8 are diagrams showing a signal transfer system for an elevator in the prior art, in which FIG. 6 is a general block circuit diagram of the prior-art system, FIG. 7 is a detailed diagram of a portion VII in FIG. 6, and FIG. 8 is a waveform diagram of a transfer signal.

Throughout the drawings, the same symbols indicate identical or equivalent portions.

DESCRIPTION OF THE PREFERRED EMBODIMENTS

Figure 1:
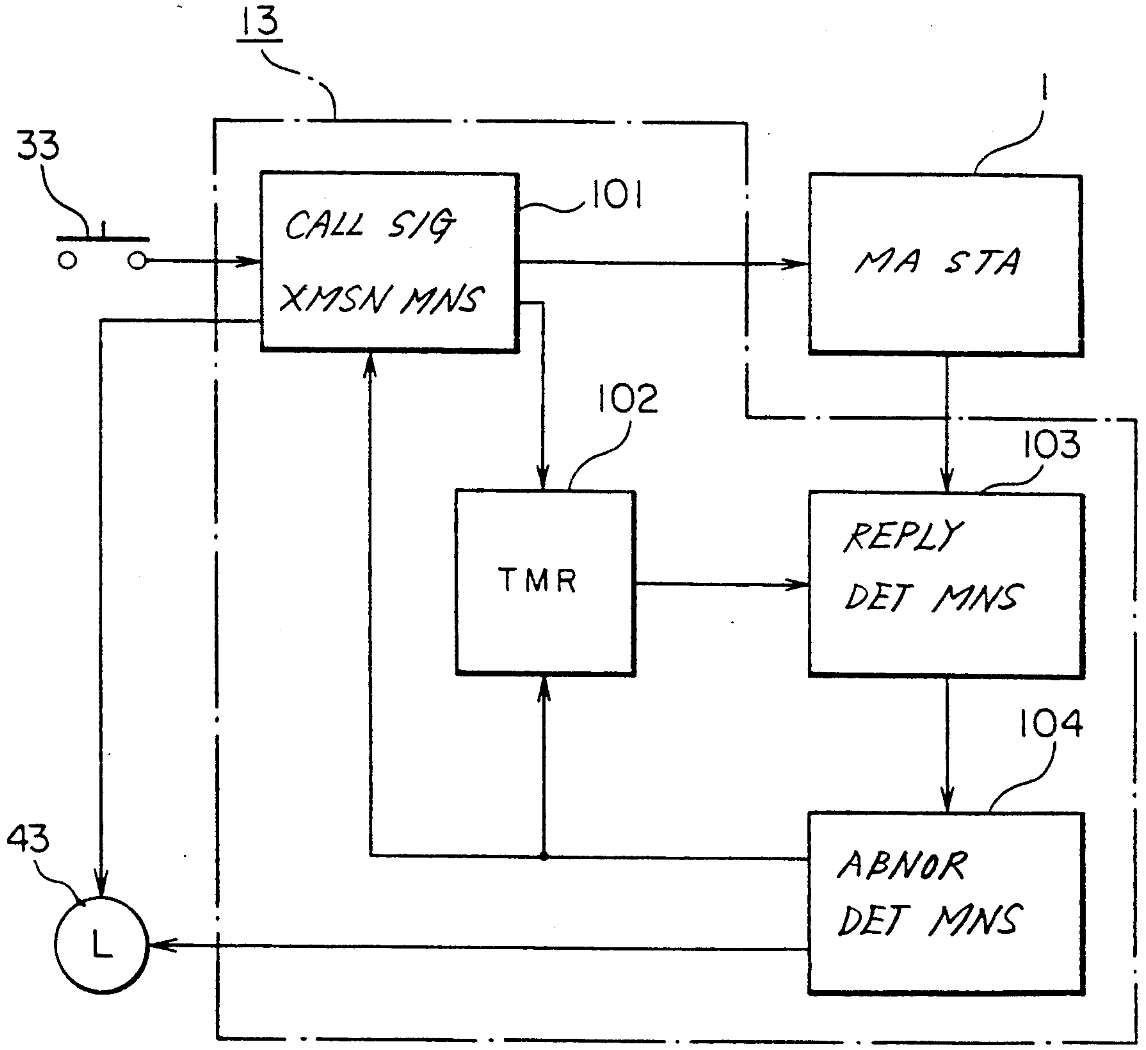
FIG. 1 is a general arrangement diagram showing an embodiment of a signal transfer system for an elevator according to this invention.
Figure 2:
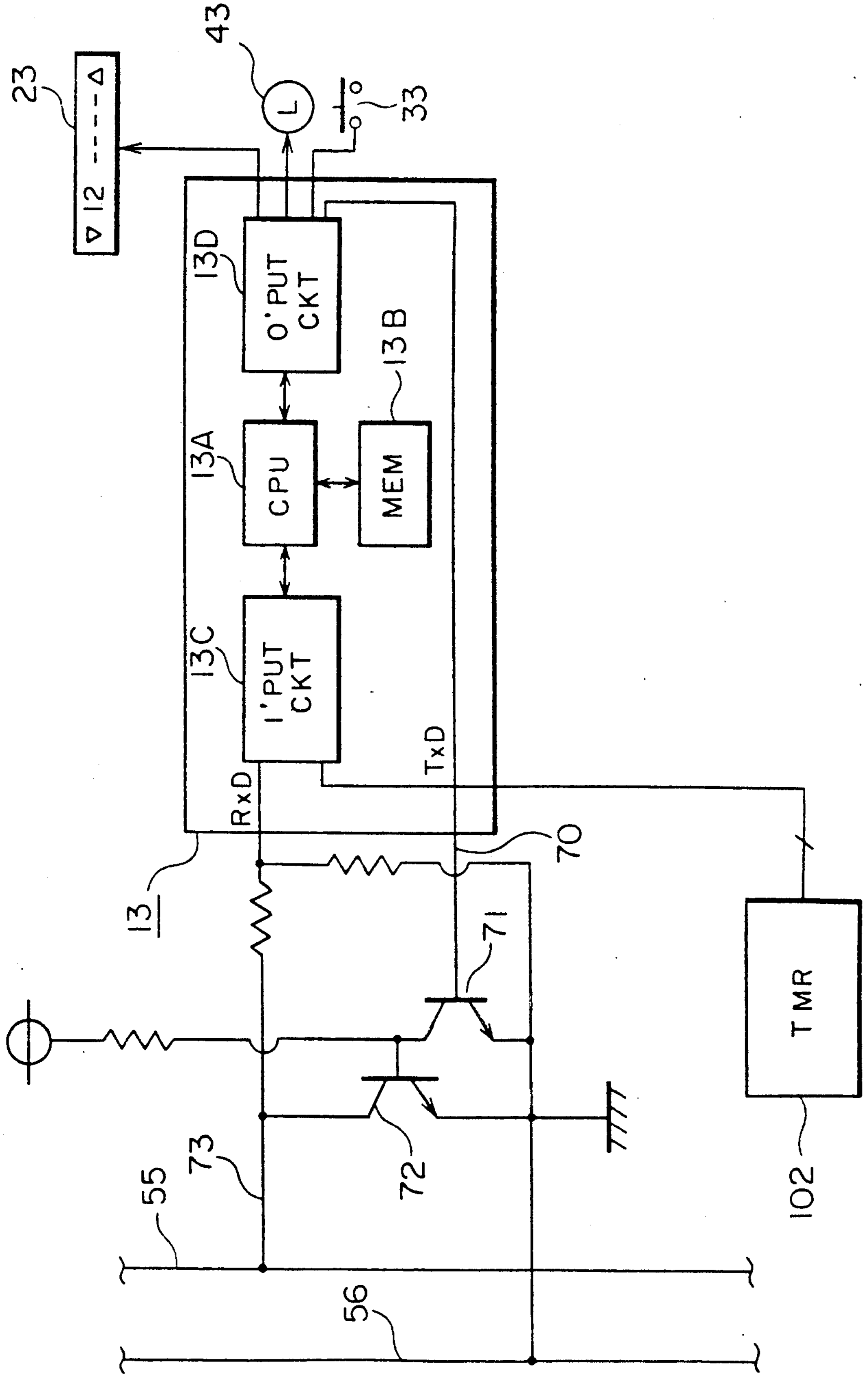
FIG. 2 is a block circuit diagram of a slave station.
Figure 3:
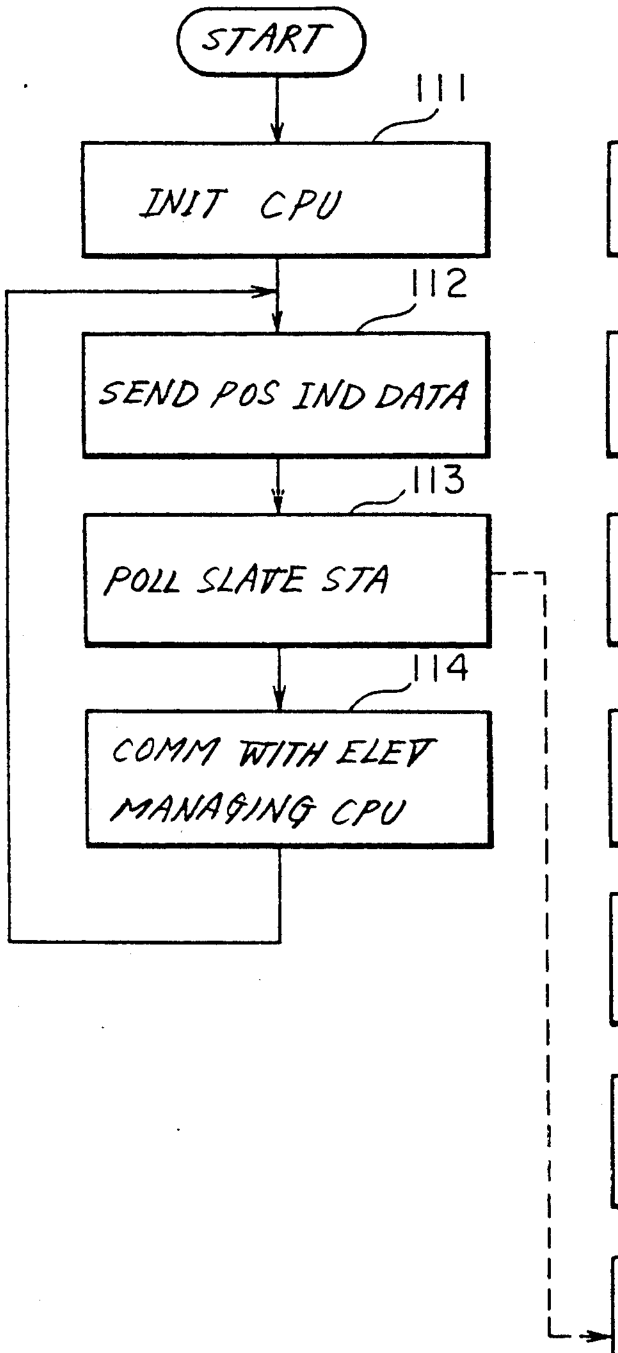
Figure 4:
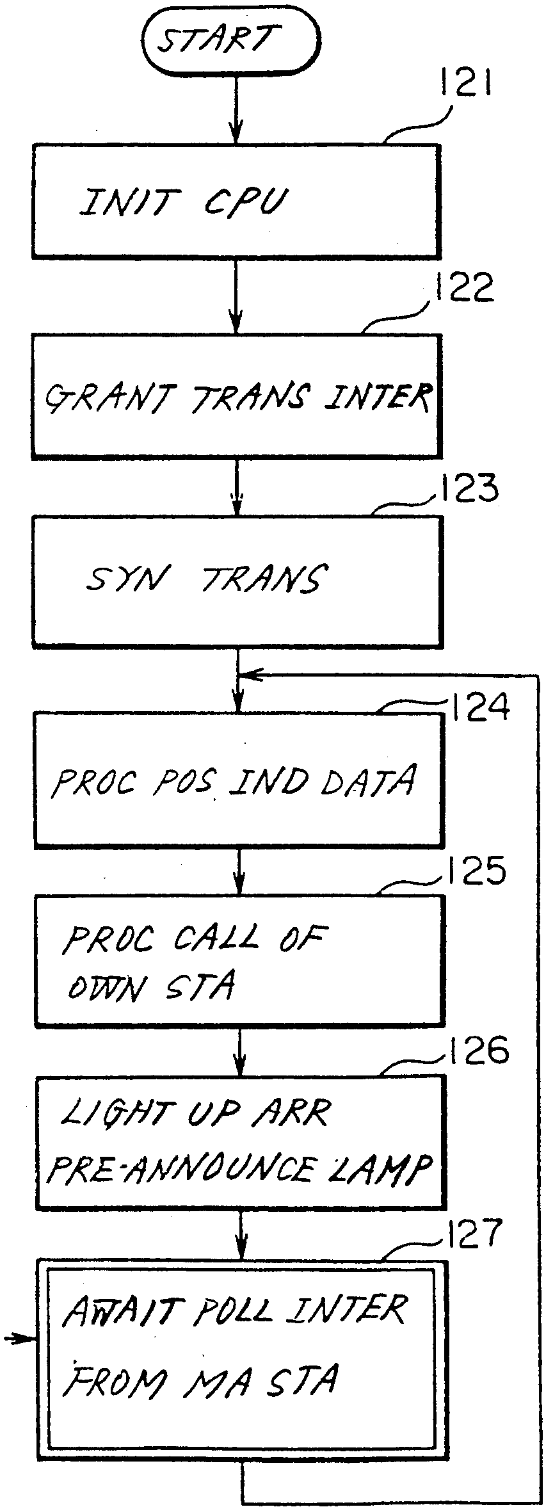
Figure 5:
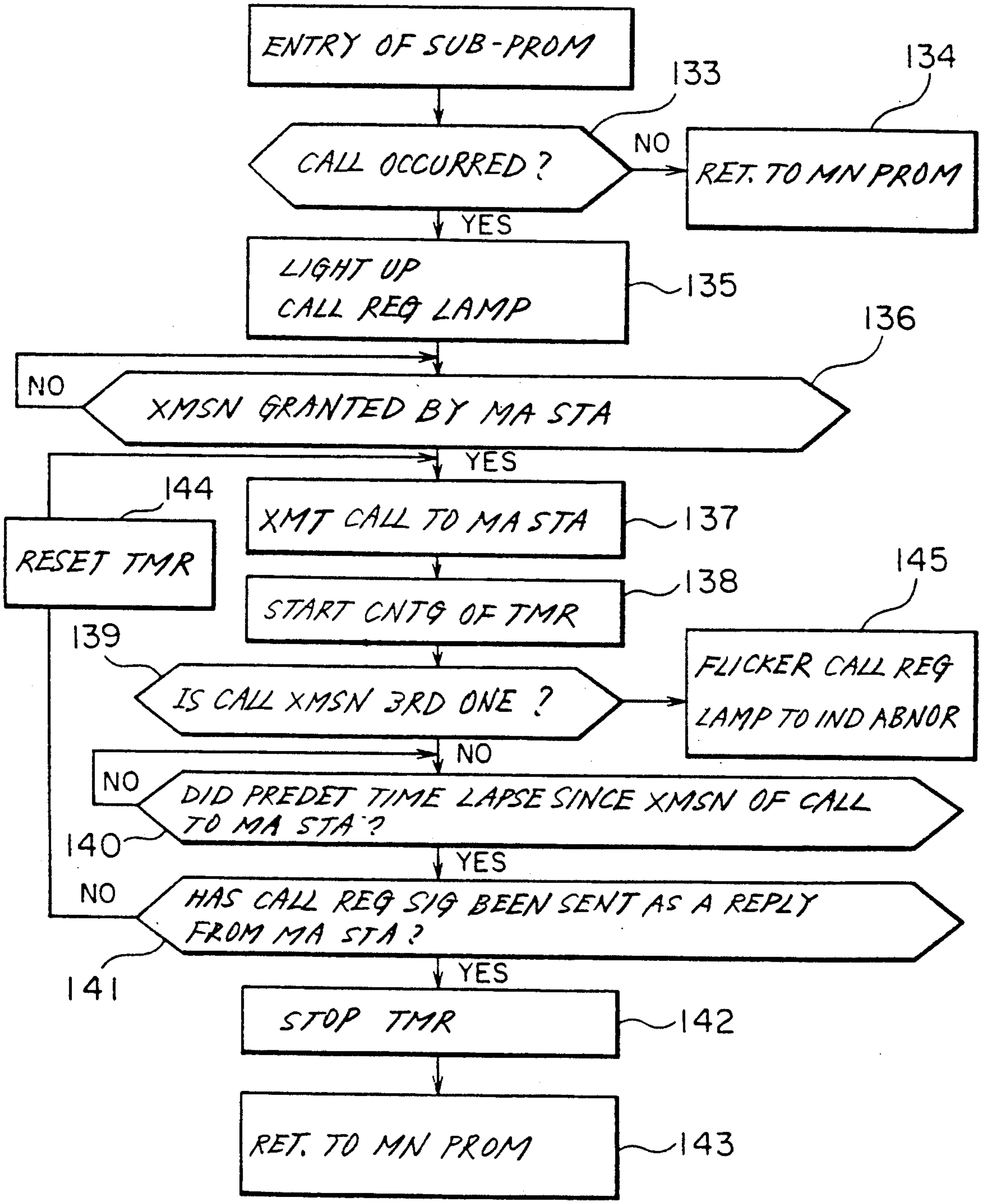
Figure 6:
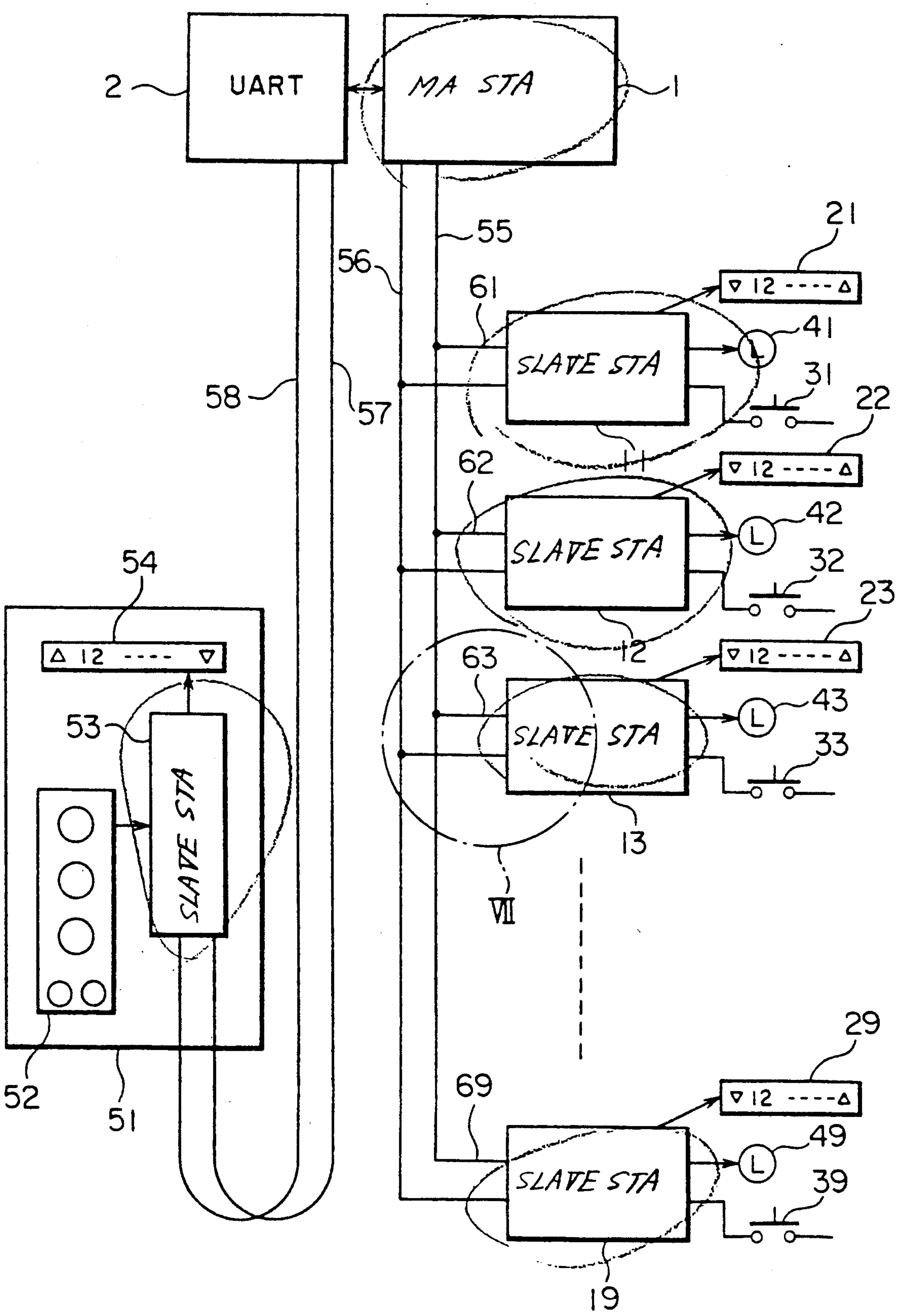
FIG. 6 PRIOR ART
Figure 7:
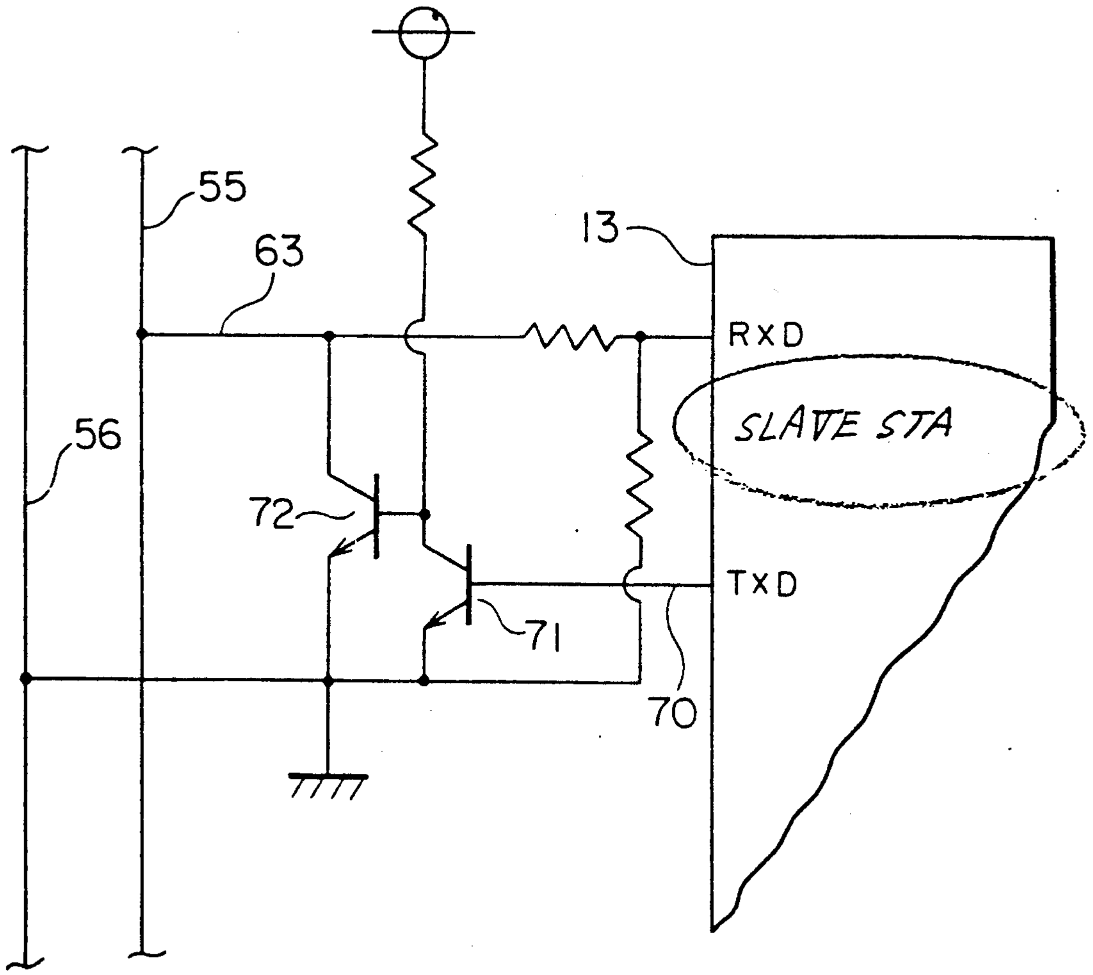
FIG. 7 PRIOR ART
Figure 8:
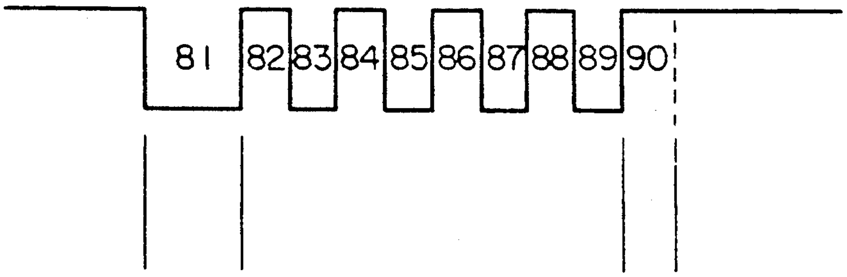
FIG. 8 PRIOR ART

FIG. 1 is a general arrangement diagram showing one embodiment of this invention, FIG. 2 is a block circuit diagram of a slave station and shows the details of a portion VII in FIG. 6, and FIGS. 3–5 are flow charts showing the programs of operations, in which FIG. 3 illustrates the program of a master station, FIG. 4 illustrates the main program of the slave station, and FIG. 5 illustrates the subprogram of the slave station. The same components as in the prior-art system shall be indicated by identical symbols. By the way, FIG. 6 is also applied to this embodiment.

This embodiment is constructed as shown in FIG. 1. When a hall button 33 is depressed, the call signal transmission means 101 of a slave station 13 immediately lights up a hall call registration lamp 43 and simultaneously transmits a hall call signal to a master station 1. Besides, a timer 102 is set to start the counting of a time interval. Upon accepting the transmitted hall call signal, the master station 1 sends a hall call registration signal to the slave station 13. Reply detection means 103 is supplied with the output of the timer 102, and it checks if the hall call registration signal has been sent as a reply within a predetermined time. Unless the means 103 receives the hall call registration signal, it delivers an output to abnormality detection means 104. The abnormality detection means 104 resets the timer 102, and commands the call signal transmission means 101 to retransmit the hall call signal to the master station 1. The abnormality detection means 104 repeats the above operation, and when the hall call registration signal is not sent as the reply in spite of retransmitting the hall call signal a predetermined number of times, this means 104 produces an output so as to flicker or put out the hall call registration lamp 43.

Referring to FIG. 2, the slave station 13 is constructed of a microcomputer, which includes a CPU 13A, a memory 13B, an input circuit 13C and an output circuit 13D. The input circuit 13C is connected to a reception terminal RxD, and is also connected to the timer 102. The output circuit 13D is connected to a position indicator 23, the hall button 33 and the hall call registration lamp 43, and it is connected to a transmission signal line 70 through a transmission terminal TxD.

Incidentally, other slave stations 11, 12, and 14–19 are similarly constructed, and also the microcomputer of the master station 1 is similarly constructed.

Next, the operation of this embodiment will be described with reference to FIGS. 3–5. A program in FIG. 3 is stored in the memory (not shown) of the master station 1, and programs in FIGS. 4 and 5 are respectively stored in each of the memories of the slave stations 11–19.

In the master station 1, a CPU is initialized at a step 111, and position indication data indicating the position of a cage 51 at a step 112. At a step 113, the slave stations 11–19 are polled to detect the hall call signal, to send the hall call registration signal and to transmit arrival preannouncement lamp data. At a step 114, the master station 1 registers the hall call and communicates with an elevator managing CPU so as to allocate the cage 51. Thereafter, the control flow of the program returns to the step 112 and repeats the steps 112–114.

In the slave station 13, the CPU 13A is initialized at a step 121, the interrupt of transfer from the master station 1 is granted at a step 122, and the transfer is synchronized at a step 123. At a step 124, the position indication data is processed to indicate the cage position on the position indicator 23. If the hall button 33 of its own is depressed, the slave station 13 stores the hall call signal at a step 125 and lights up the arrival preannouncement lamp at a step 126. At a step 127, the slave station 13 awaits the interrrupt from the master station 1 as based on the polling, whereupon the control flow of the program returns to the step 124 and repeates the steps 124–127.

Subsequently, at a step 133 illustrated in FIG. 5, the slave station 13 judges if the hall call has occurred. When the hall call has not occurred, the control of the subprogram returns to the main program at a step 134, and the steps in FIG. 4 are executed. When the hall call has occurred, the subprogram of the slave station 13 proceeds to a step 135, at which the hall call registration lamp 43 is lit up. At a step 136, the slave station 13 awaits the issue of a transmission grant from the master station 1 as based on the polling. When the transmission grant is issued, the hall call signal is transmitted to the master station 1 at a step 137, and the counting of the time interval by the timer 102 is started at a step 138. Whether or not the transmission of the hall call signal is the third one, is judged at a step 139. Unless the number of times of the transmitting operations is not reached three, the lapse of the predetermined time since the transmission of the hall call signal to the master station 1 is awaited at a step 140. Whether or not the hall call registration signal has been sent as the reply from the master station 1, is judged at a step 141. If the hall call registration signal has been sent as the reply, the timer 102 is stopped at a step 142, and the control flow returns to the main program at a step 143 so as to execute the steps in FIG. 4.

When it is judged at the step 141 that the hall call registration signal has not been sent as the reply, the timer 102 is reset at a step 144, and the control flow returns to the step 137. Then, the hall call registration signal is retransmitted to the master station 1, and the steps 138–141 and 144 are repeated. When it is judged at the step 139 that the above processing has been repeated three times (that a serious fault has occurred in the slave station 13), the hall call registration lamp 43 is flickered at a step 145 so as to inform the user of the abnormality. Regarding the other slave stations 11, 12 and 14–19, the same processing steps are carried out. Also, regarding a cage call, the same processing steps are carried out in a slave station 53.

Although, in the foregoing embodiment, the abnormality has been displayed after the third operation of retransmitting the call signal, the number of the retransmitting operations may be any as long as the other conditions such as a program cycle permits.

In addition, although the corresponding one of hall call registration lamps 41–49 has been flickered for the display of the abnormality, it may well be put out, and the user can be similarly informed of the abnormality.

As thus far described, this invention is so constructed that when a call occurs, a slave station lights up a call registration lamp and transmits a call signal to a master station, that when a call registration signal from the master station is not thereafter sent as a reply within a predetermined time, the slave station retransmits the call signal, and that when the call registration signal is not sent as the reply in spite of retransmitting the call signal a predetermined number of times, the slave station flickers or puts out the call registration lamp. Therefore, the invention has the effect that a cage can be allocated subject to a temporary fault, while when a serious abnormality has taken place it can be promptly displayed for a user.

What is claimed is:

1. A master-slave system for monitoring transmission of elevator cell signals comprising:
   - a plurality of slave stations each having call signal transmission means for transmitting call signals and illuminating call registration lamps;
   - a master station which receives said call signals from said slave station and transmits a call registration signal to a slave station responding to a call signal thereupon;
   - each of said slave stations having:
     - a timer which measures a time interval between transmission of a call signal and receipt of a call registration signal at a respective slave station;
     - reply detection means, for transmitting an output signal when a call registration signal has not been received within a predetermined time interval; and
     - abnormality detection means operable responsive to the output signal from said reply detection means for initiating retransmission of a call signal and resetting said timer, said abnormality detection means also being operable for extinguishing said call registration lamps when the output signal is not transmitted after retransmitting a call signal a predetermined number of times.

2. A master-slave system according to claim 1, where certain of said slave stations are located in elevator halls and certain of said call signals are hall call signals.

3. A master-slave system according to claim 2, where others of said slave stations are located in elevator cages and others of said call signals are cage call signals.

4. A master-slave system for monitoring the transmission of elevator cage call and elevator hall call signals comprising:

a plurality of slave stations associated with hall call registration lamps disposed in hall panels of respective floors which transmit hall call signals and illuminate the hall call registration lamps;

a plurality of slave stations associated with cage call registration lamps disposed in cage panels of respective cages which transmit cage call signals and illiminate the cage call registration lamps, a master station which receives call signals from said slave stations and transmits a call registration signal to a slave station in response to a call signal therefrom;

each of said slave stations having:

a timer which starts a timekeeping operation when a respective slave station transmits the call signal to said master station, reply detection means for receiving an output of said timer and for transmitting an output signal when a call registration signal from said master station has not been received within a predetermined time interval measured from the start of the time keeping operation, and abnormality detection means for retransmitting a call signal to said master station responsive to said output signal and for extinguishing an associated registration lamp when the call registration signal is not received by the reply detection means after retransmitting the call signal a predetermined number of times.

* * * * *

UNITED STATES PATENT AND TRADEMARK OFFICE

CERTIFICATE OF CORRECTION

PATENT NO. : 5,019,960

DATED : May 28, 1991

INVENTOR(S) : Ando et al

It is certified that error appears in the above-identified patent and that said Letters Patent is hereby corrected as shown below:

In the abstract, line 4, change "registratioin" to --registration--

Column 6, line 41, change "cell" to --call--

Signed and Sealed this

Thirteenth Day of October, 1992

*Attest:*

DOUGLAS B. COMER

*Attesting Officer*

*Acting Commissioner of Patents and Trademarks*